(12) United States Patent
Warren et al.

(10) Patent No.: US 7,752,343 B2
(45) Date of Patent: Jul. 6, 2010

(54) METHOD AND APPARATUS FOR AUTO-PROTOCOL DISCRIMINATION BETWEEN FIBRE CHANNEL, SAS AND SATA DEVICES

(75) Inventors: Bruce Gregory Warren, Costa Mesa, CA (US); William Patrick Goodwin, Costa Mesa, CA (US); Hugh Le, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 106 days.

(21) Appl. No.: 11/360,558

(22) Filed: Feb. 22, 2006

(65) Prior Publication Data

US 2007/0223517 A1 Sep. 27, 2007

(51) Int. Cl.
*G06F 3/00* (2006.01)
*G06F 11/00* (2006.01)
(52) U.S. Cl. .......................................... 710/8; 370/241
(58) Field of Classification Search .................. 710/8, 710/100; 711/100
See application file for complete search history.

(56) References Cited

U.S. PATENT DOCUMENTS

| | | | |
|---|---|---|---|
| 6,477,171 B1* | 11/2002 | Wakeley et al. | 370/404 |
| 7,093,033 B2* | 8/2006 | Beckett et al. | 710/11 |
| 7,155,546 B2* | 12/2006 | Seto | 710/100 |
| 2004/0081187 A1* | 4/2004 | Warren et al. | 370/419 |
| 2005/0149656 A1* | 7/2005 | Seto | 710/105 |
| 2005/0196119 A1* | 9/2005 | Popovic et al. | 385/134 |
| 2006/0110157 A1* | 5/2006 | Tritschler et al. | 398/22 |
| 2007/0083707 A1* | 4/2007 | Holland et al. | 711/114 |
| 2007/0116038 A1* | 5/2007 | Holt et al. | 370/465 |

* cited by examiner

*Primary Examiner*—Henry W. H. Tsai
*Assistant Examiner*—Titus Wong
(74) *Attorney, Agent, or Firm*—Morrison & Foerster LLP (57) ABSTRACT

Auto-discrimination between FC and SATA devices upon insertion of a device into a port of a FAST-compatible switch is disclosed. Without user intervention, the port is able to determine the type of device attached, set the appropriate data rate in the Phy or SERDES and, in the case of FC or SATA drives, start the disk insertion process into the active switch zones. The SERDES is first initialized to FC speeds, and the receive path is searched for a receive signal. Upon detecting a receive signal, the detection circuitry then checks to see if a valid SATA Out Of Band (OOB) sequence is received. If a valid SATA OOB sequence is received, the SERDES is configured for SATA speeds and analog settings. If a valid SATA OOB sequence is not received, and instead a FC auto-negotiation process runs to completion, the SERDES remains at FC speeds.

12 Claims, 6 Drawing Sheets

METHOD AND APPARATUS FOR AUTO-PROTOCOL DISCRIMINATION BETWEEN FIBRE CHANNEL, SAS AND SATA DEVICES

FIELD OF THE INVENTION

This invention relates to communications over Storage Area Networks (SANS) that allow for the encapsulation of Serial Advanced Technology Attachment (SATA) Frame Information Structures (FISs) into Fibre Channel (FC) frames for transmission over FC SANs that utilize SATA disk drives, and more particularly, to automatically determining whether a newly inserted disk drive is a SATA or FC drive and configuring the data rate of the port accordingly.

BACKGROUND OF THE INVENTION

FC is a serial transport protocol that was developed for carrying other transport protocols. In conventional SANs, FC carries Small Computer System Interconnect (SCSI), which is a parallel protocol. In other words, parallel SCSI commands are encapsulated within FC frames and transported over FC links in FC SANs.

Figure 1:
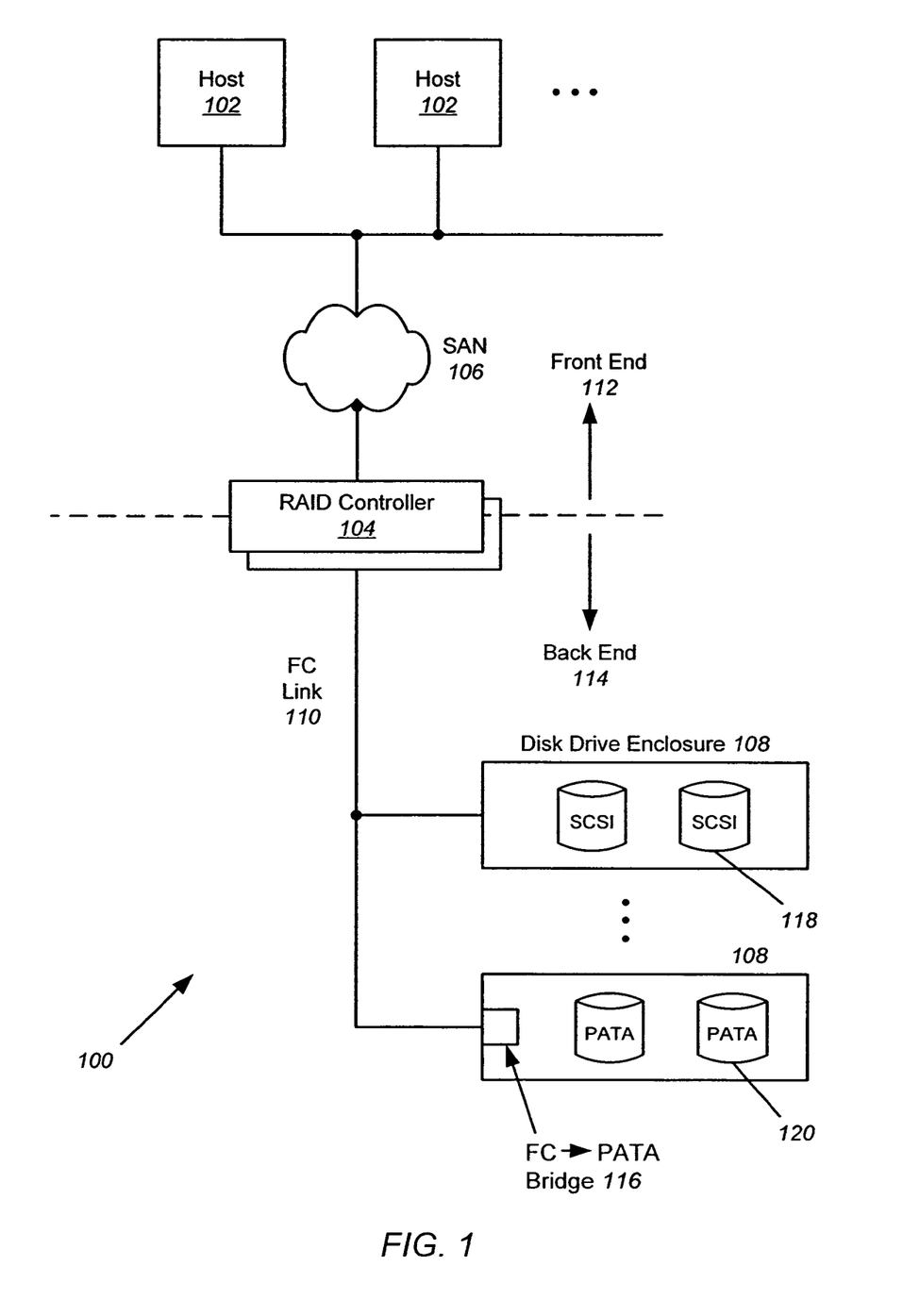
FIG. 1 is an illustration of an exemplary SAN including one or more hosts connected to two RAID controllers and two disk drive enclosures over a network, with one of the enclosures including a FC-to-PATA bridge.

FIG. 1 illustrates an exemplary conventional SAN 100 which includes one or more hosts 102 connected to two Redundant Array of Independent Disks (RAID) controllers 104 over a network 106. The host side of the RAID controllers 104 is referred to as the "front end" 112. In conventional SANs 100, the RAID controllers 104 are connected to a plurality (e.g. 30 to 100) of drives in disk drive enclosures 108, and send and receive FC frames over a FC link 110. The disk drive enclosure side of the RAID controllers 104 is referred to as the "back end" 114. In conventional SANs 100, the disk drives within the disk drive enclosures are FC drives 118 that operate according to the SCSI protocol.

FC drives offer the best performance, but are expensive. Therefore, less expensive (but lower performance) Advanced Technology Attachment (ATA) drives of the type commonly used in desktop or notebook computers have been used in place of FC drives, or along with FC drives in what is known as tiered storage. The ATA drives may be Parallel ATA (PATA) or Serial ATA (SATA) drives. FIG. 1 illustrates a SAN in which one of the disk drive enclosures 108 contain PATA drives 120 rather than FC drives. PATA drives require a FC-to-PATA bridge 116, which is relatively expensive and effectively makes the PATA disk drives 120 appear as SCSI drives to the RAID controller 104. In other words, the RAID controllers 104 send FC encapsulated SCSI commands to the disk drive enclosures, and receive FC encapsulated SCSI commands from the disk drive enclosures, and the conversion between FC and PATA occurs in the bridge 116, transparent to the RAID controllers 104 and the rest of the SAN 100. Because PATA drives are different from FC drives in terms of interfaces, error recovery and discovery, FC-to-PATA bridges are designed to be specific to a particular type of PATA drive. As a consequence, every time a new PATA drive is developed, the FC-to-PATA bridge may require modification.

In disk drive technology, as well as in transport technology, there are reliability, speed and cable distance benefits to utilizing serial protocols rather than parallel protocols. SATA drives, the serial counterpart to PATA drives envisioned for consumer applications, are therefore now being contemplated as an upgrade to PATA in FC SANs that have historically utilized SCSI drives. Previous solutions for utilizing SATA drives in FC SANs utilized a conversion interface, or bridge, between the FC link and the SATA device. These conversion interfaces terminated all FC exchanges and initiated corresponding SATA exchanges at or near the targets. These bridging solutions required a bridge unit per SATA device or a bridge per SATA enclosure, and as a result were prohibitively expensive solutions in a SAN environment. In addition, all error cases were dealt with at or near the drive level. In the other direction, SATA exchanges were also terminated and FC exchanges were created and sent to the FC initiator. Because the FC to SATA translation was performed independently at each SATA drive or enclosure, there was no clean way of performing this conversion and the approach was prone to performance and interoperability issues. Error recovery in FC is also much different than SATA. The interface had to deal with the differences, which added complexity and additional cost to the system.

To overcome the problems inherent in the previously described solutions, novel methods and apparatus for enabling SATA drives to be utilized in FC SANs were disclosed in U.S. application Ser. No. 11/104,230 entitled "Tunneling SATA Targets Through Fibre Channel," filed on Apr. 11, 2005, and U.S. application Ser. No. 11/104,341 entitled "Method and Apparatus for SATA Tunneling Over Fibre Channel," also filed on Apr. 11, 2005, both of which are incorporated by reference herein. These applications introduce Fibre Channel Attached SATA Tunneling (FAST), or more formally FC-SATA, a new protocol that allows the transport of SATA command and data FIS over a FC infrastructure. The FC infrastructure and FC transport are preserved to the greatest extent possible to minimize the changes needed to legacy FC SANs. Translation and protocol handling is moved into the RAID controllers, which is a cost-effective solution because the RAID controllers can perform the protocol translation for a large number of drives. Supporting FC and SATA on the same interface is similar to the way Serial Attached SCSI (SAS) supports SATA via the SATA Tunneling Protocol (STP). While SAS support of STP is defined in the SAS specification, no mechanism was provided for the FC-SATA protocol until the introduction of FAST in the applications referred to above.

Figure 2:
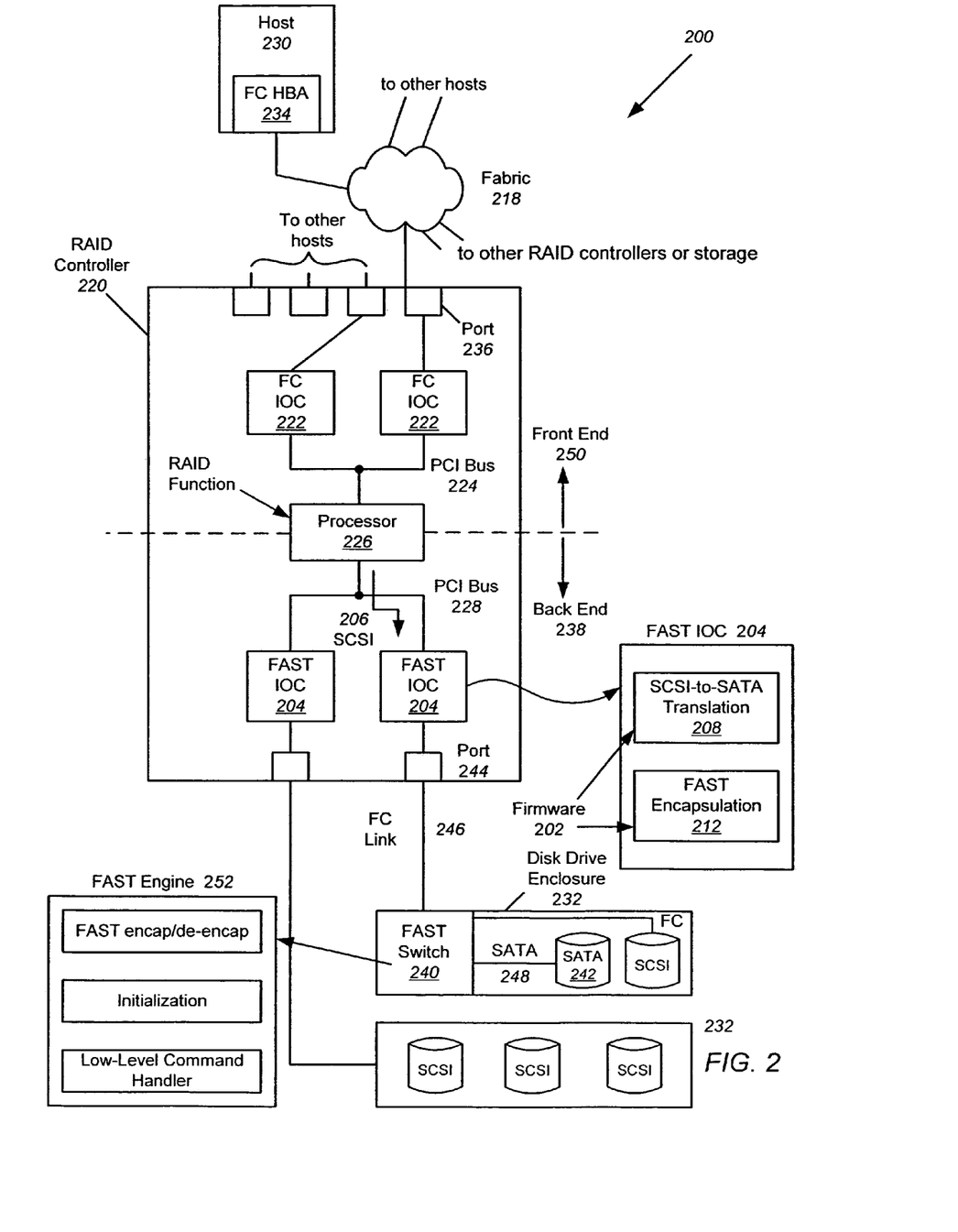
FIG. 2 is an illustration of an exemplary SAN including a host, a RAID controller including a FAST IOC, and a disk drive enclosure containing SATA drives and a FAST switch, the FAST switch capable of implementing an auto-detection process according to embodiments of the present invention.

FIG. 2 illustrates a SAN 200 including SATA drives and a conversion from FC to SATA using the new FAST or FC-SATA protocol. When SCSI commands are to be sent from host 230 to SATA drives 242 in disk drive enclosure 232, a FC HBA 234 in host 230 sends FC frames encapsulating the SCSI commands out over the fabric 218 to a RAID controller 220, where they are received in one of the ports 236 on the RAID controller 220. The FC frames are then routed to FC IOCs 222 in the RAID controller 220. The SCSI commands within the FC frames are then de-encapsulated by the FC IOCs 222 and passed over a Peripheral Component Interconnect (PCI) bus 224 to a processor 226, which performs the RAID function and creates multiple commands to satisfy the received SCSI command. The created commands may be SCSI commands or SATA commands and will be sent to one or more disk drives within enclosures 232.

The SCSI commands 206 are then passed from the processor 226 over a custom interface 228 (which may include, but is not limited to a PCI bus) to FAST-enabled IOCs 204. The FAST IOCs 204 contain the same hardware as conventional FC IOCs, but include additional firmware 202 to allow it to handle both FC and SATA. SCSI commands 206 from processor 226 are converted in SCSI-to-SATA translation firmware 208 to SATA FISs. The SATA FISs are then encapsulated by FAST encapsulation firmware 212 into FC frames. In particular, each 8 kByte SATA FIS is encapsulated into four 2 kByte FC frames along with modifications to the header in the FC frames that enable the SATA-encapsulated FC frames to traverse a FC link. The FAST IOC 204 then sends the FC frames out over a FC link 246 via a FC port 244.

The FC frames are received by FAST switches 240 in disk drive enclosures 232, which are utilized instead of FC-to-SATA bridges. The drives can be presented as pure ATA throughout the SAN, while using FC as the transport. The FAST switches 240 include a FAST engine 252, which de-encapsulates the FC frames to retrieve the SATA FISs, handles initialization, sequences, exchanges, and all of the low-level FC commands and structures. The de-encapsulated SATA FISs are then communicated over a pure SATA connection 248 to the SATA drives 242.

The reverse of the above-described process is employed when a SATA drive 242 sends SATA FISs back to the host 230. Thus, when SATA FISs are to be sent from a SATA drive 242 to the RAID controller 220, the SATA FISs are sent over the SATA connection 248 to the FAST switch 240, where it is encapsulated in FC frames. The FAST switch 240 then transmits the FC frames over the FC link 246 to the RAID controller 220, where they are received by the FAST IOC 204. The FAST IOC 204 receives the FC frames, de-encapsulates the frames to retrieve the SATA FISs, and performs a SATA to SCSI translation 208 so that the RAID controller will see the target drive 242 as a SCSI device. The SCSI commands are sent to the processor 226 over PCI bus 228, which performs the RAID function and identifies the hosts (initiators) for which the SCSI data is destined. The SCSI data is then sent to the FC IOCs 222 over PCI bus 224, where they are encapsulated into FC frames and sent to the appropriate hosts over the fabric 218. The hosts then de-encapsulate the FC frames to retrieve the SCSI commands.

Figure 3:
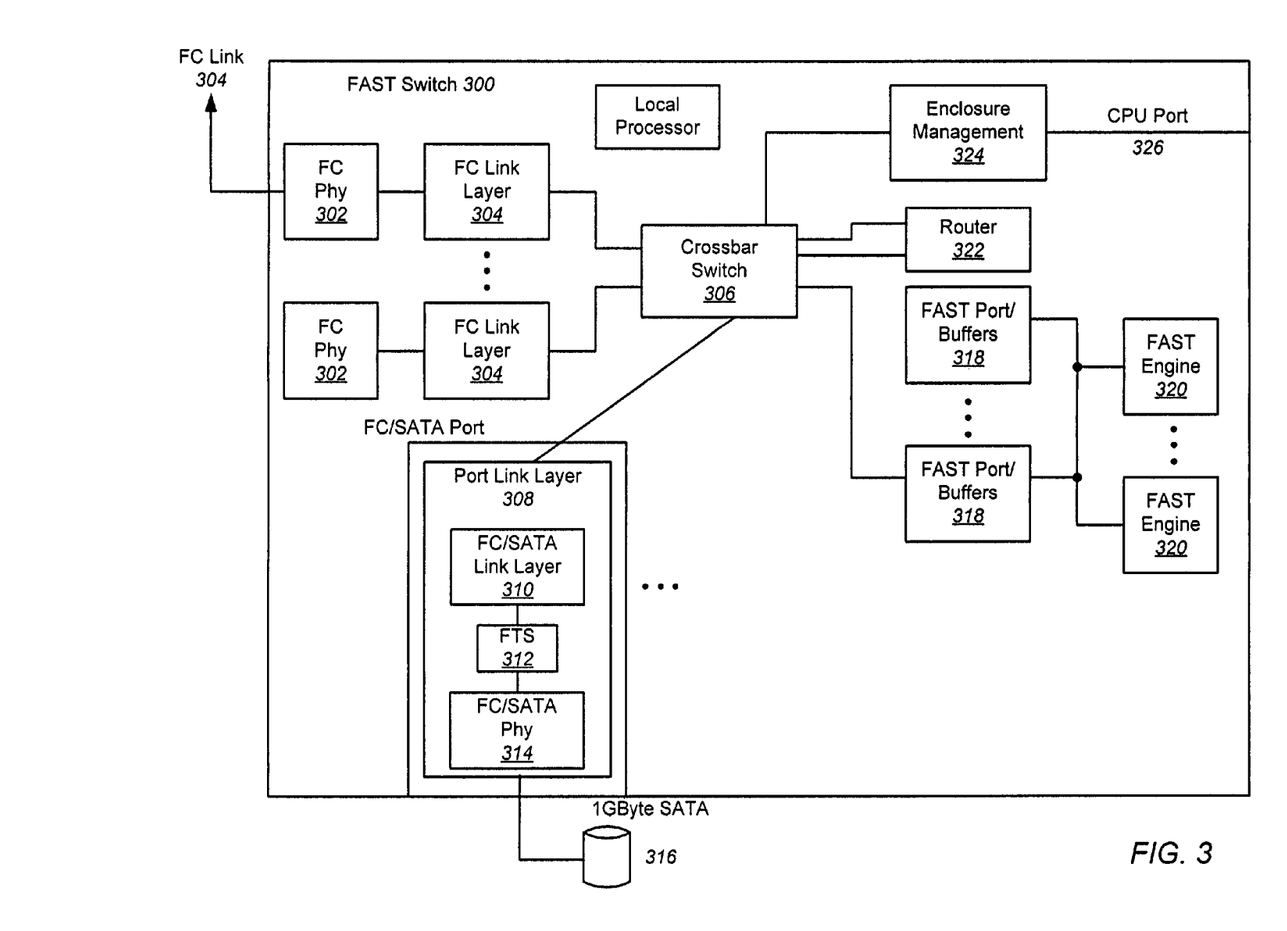
FIG. 3 is an illustration of an exemplary FAST switch.

FIG. 3 illustrates an exemplary FAST switch 300 (e.g. FAST switch 240 in FIG. 2) resident in a FAST disk drive enclosure (e.g. enclosure 232 in FIG. 2). The FAST switch 300 contains a number of FC Phy 302 and FC link layers 304 for interfacing with the FC ports on one or more RAID controllers over a FC link 304. The FC Phy 302 and FC link layers 304 handle all the primitives in FC. These layers monitor received FC primitives, modifying the active switch matrix connections in response to traffic going across the FC link. The FC link layers 304 are connected to a crossbar switch 306, which is also connected to a number of port link layers 308, one in each FC/SATA port, for connecting to either a FC device or a SATA device. The crossbar switch 306 operates in FC Arbitrated Loop (FC_AL) space, and performs a switching function. It uses the FC Arbitrated Loop Physical Address (AL_PA) and OPN ordered sets to determine the destination of a connection request, and makes a connection across the crossbar switch to the target device.

Each port link layer 308 includes a FC/SATA link layer 310, a FC Tunneling SATA (FTS) layer 312, and a FC/SATA Phy 314. The FTS layer 312 contains logic which detects whether the port link layer 308 is connected to a SATA drive by detecting SATA ordered sets, and determines the status of the SATA drive. The FC/SATA Phy 314 are connected to SATA or FC drives 316.

Also connected to the crossbar switch 306 are FAST port/buffers 318 coupled to the crossbar switch 306 and one or more (e.g. four) FAST engines 320. The FAST engine 320 contains a full SATA core (and a Register Transfer Level (RTL) state machine) that understands the lower levels of the SATA protocol. A router 322 is connected to the crossbar switch 306 and makes routing decisions within the crossbar switch 306. Also connected to the crossbar switch 306 is an enclosure management function 324 controllable by a CPU port 326. The CPU port is a path to allow a processor to monitor FC frames locally.

As previously noted, no mechanism was provided for a FC-SATA protocol until the introduction of FAST in the applications referred to above. FC and SATA both had defined initialization sequences for their own protocols, but until the introduction of FAST, there was no need to auto-discriminate between the two protocols because they could not be supported by the same infrastructure.

With the introduction of the FAST protocol, either FC or SATA drives can be inserted into a port. Therefore, there is now a need to allow users to insert either FC or SATA drives into a FAST-compatible system and have the system auto-detect the protocol support required by the drive, without any user interaction required to reconfigure the system. In particular, there is a need for a FAST-compatible port to automatically determine the drive type (e.g. FC or SATA), set the appropriate data rate for the Phy or SERializer/DESerializer (SERDES), and start the disk insertion process when a drive is inserted into the port.

SUMMARY OF THE INVENTION

Embodiments of the present invention automatically detect the device type (either FC or SATA) upon insertion of a device into a FC/SATA port of a FAST-compatible device enclosure and set the FC/SATA Phy in the port to the appropriate data rate. The detection scheme according to embodiments of the present invention utilizes known SATA Out Of Band (OOB) sequences to identify a SATA drive, illustrated in the example of FIG. 4. Descriptions of a FC auto-speed negotiation protocol and SATA OOB sequences are described fully in their respective standards documentation, and also in "Serial SATA Storage Architecture and Applications" by Knut Grimsrud and Hubbert Smith, Intel Press 2003, the contents of which are incorporated by reference herein.

The FC/SATA Phy is first initialized to the highest possible FC speed and analog settings. Configuring the FC/SATA Phy so that it is FC compliant during the idle state allows quick servicing of FC devices so that FC insertion timing specifications may be met and time is not wasted changing to FC speeds and waiting for Phase-Locked Loops (PLLs) and other circuits to settle. Next, the FC/SATA port monitors its receive path to determine if a loss of receive signal is present (i.e. rx_los is asserted). As long as there is no receive signal, indicating that no device has been inserted, the FC/SATA Phy remains at the highest possible FC speed and the port link layer continues to monitor its receive path for a receive signal.

When a signal is detected (i.e. rx_los is de-asserted), this may be an indication that either a FC device has been inserted (in which case rx_los would remain de-asserted) or that a SATA device has been inserted (in which case rx_los would change states from asserted to de-asserted at regular, predictable intervals). Thus, when a signal is detected, the FC/SATA port monitors the receive path for SATA OOB signals or known FC ordered sets, and starts a known FC auto-negotiation process under the assumption that the inserted device is a FC device. If the FC auto-negotiation process completes successfully, indicating that a FC device was inserted, then switch management hardware and firmware is notified that the device is ready for insertion. Thereafter, as long as there is no loss of receive signal (i.e. rx_los is de-asserted), there is no change of state. If a loss of receive signal is ever detected (i.e. rx_los is asserted), then the FC/SATA Phy is once again initialized to the highest possible FC speed and analog settings, and the auto-detection process starts again.

However, if the FC negotiation is not successful, the FC/SATA port checks to see if a SATA OOB sequence is detected by monitoring the receive path for a certain number of expected rx_los assertion and de-assertion patterns. If a SATA OOB sequence is not detected, the receive path is once again monitored for SATA OOB signals or known FC ordered sets, and a known FC auto-negotiation process is started under the assumption that the inserted device is a FC device. If a SATA OOB sequence is detected as a predetermined number of rx_los de-assertions with an expected timing relationship, this is an indication that a SATA device has been inserted, and thus the FC/SATA Phy switches to the lowest possible SATA speed and SATA analog settings.

The FC/SATA port waits for the FC/SATA Phy to become locked at a SATA speed, and then attempts to perform a SATA OOB initialization sequence with the inserted SATA disk drive. If the SATA OOB sequence is successful, then the switch management hardware and software is notified that the device is ready for insertion. Thereafter, as long as there is no loss of receive signal (i.e. rx_los is de-asserted), there is no change of state. If a loss of receive signal is ever detected (i.e. rx_los is asserted), then the FC/SATA Phy is once again initialized to the highest possible FC speed and analog settings, and the auto-detection process starts again. If the SATA OOB sequence is unsuccessful, the FC/SATA Phy is once again initialized to the highest possible FC speed and analog settings, and the auto-detection process starts again.

The auto-detection of the device type and subsequent setting for the FC/SATA Phy to the correct speed greatly enhances the ease of use of FAST switches, and more globally, FAST-compatible SANs, because it frees up a user from having to manually configure the FC/SATA Phy each time a device is inserted.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

As described above, the FAST protocol enables both FC and SATA devices to be utilized in the same SAN. However, because FC currently operates at either 1, 2 or 4 GBit/sec data rates, and SATA currently operates at completely different data rates (either 1.5 or 3 GBit/sec), the FC/SATA Phy or SERDES in the Port Link Layer of a FC/SATA port in the FAST switch must be set to the data rate appropriate for the attached device. Embodiments of the present invention automatically detect the device type upon insertion of a device into a FC/SATA port of a FAST-compatible device enclosure and thereafter set the FC/SATA Phy to the appropriate data rate. The auto-detection process may be implemented in hardware resident in each of the FC/SATA ports of the FAST switch. For example, the auto-detection process may be implemented in FC/SATA ports of the FAST switch 300 of FIG. 3, or the FAST switch 240 of FIG. 2.

The automatic device type detection and speed configuration circuit and process of the present invention provides an advantageous feature at all levels of integration, from the individual port level to the entire SAN illustrated in FIG. 2, because either a FC or a SATA device can be inserted and utilized within the same disk drive enclosure and SAN, without a need for manually detecting or otherwise identifying the type of device and setting the FC/SATA Phy of the port to the appropriate data rate.

Figure 4:
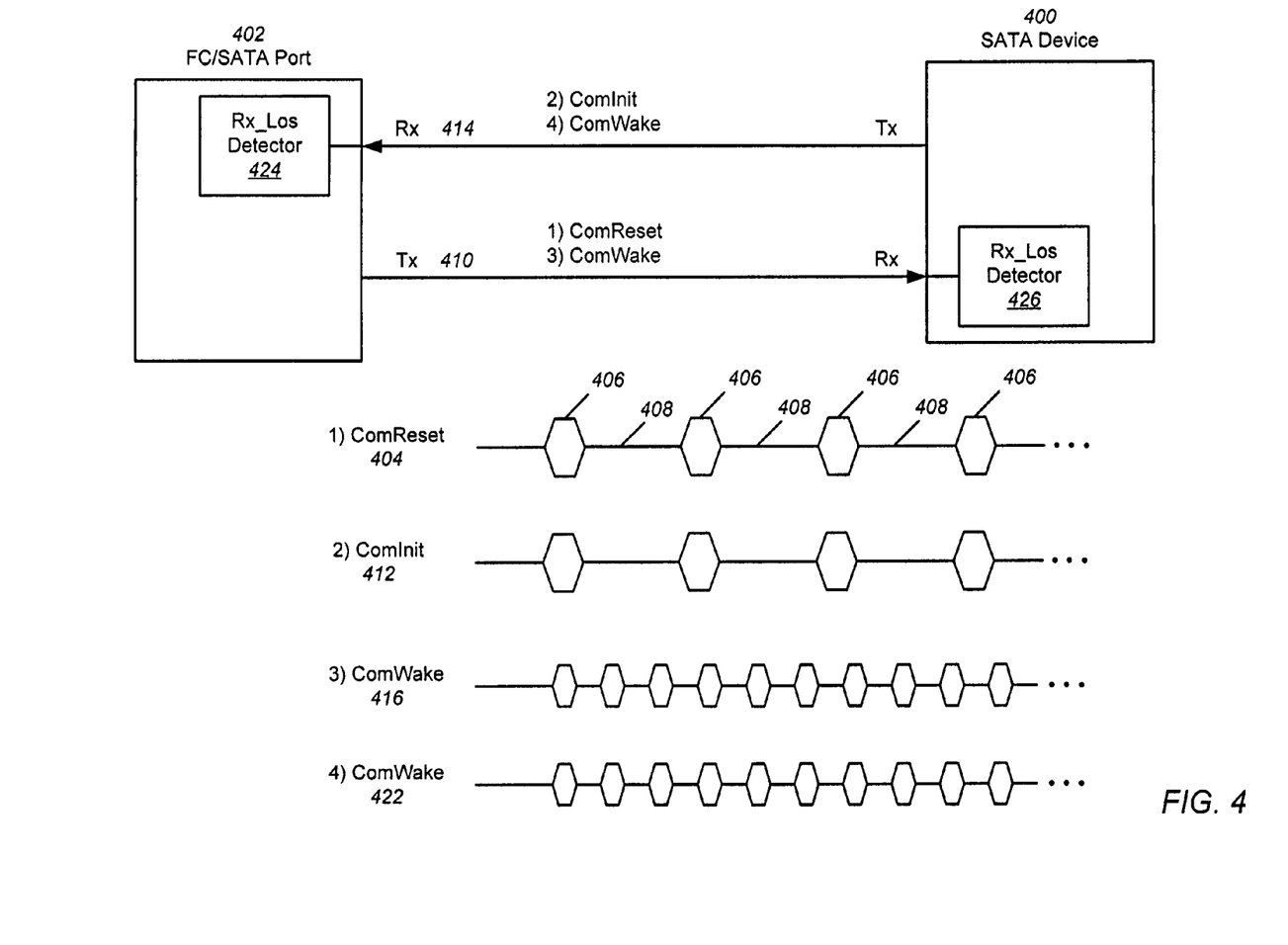
FIG. 4 is an illustration of an exemplary SATA Out Of Band (OOB) initialization sequence.

The detection scheme according to embodiments of the present invention utilizes known SATA OOB initialization sequences to identify a SATA device, illustrated in the example of FIG. 4. In FIG. 4, a SATA drive 400 has just been connected to a FC/SATA port 402 in a FAST switch. The SATA drive sends ComInit signals to the FC/SATA port 402 until the initialization sequence is started. The FC/SATA port 402 begins the initialization sequence in a reset state in which it sends a ComReset signal 404 to the SATA drive 400 over differential lines 410 to place the drive in a reset state. The ComReset signal 404 is an OOB signal that is actually a sequence of (e.g. six) fixed FC/SATA port transmitter "on" periods 406 (e.g. 106 ns) containing SATA Align primitives followed by longer fixed FC/SATA port transmitter "off" periods 408 (e.g. 318 ns). The result of repeatedly turning the FC/SATA port transmitter on and off for fixed periods of time is a signal on differential lines 410 with a certain peak-to-peak voltage level when the FC/SATA port transmitter is on, and a much smaller voltage level when the FC/SATA port transmitter is off. A receive loss (rx_los) detector circuit 426 coupled to differential receive lines 410 detects the ComReset signal 404 and places the SATA drive 400 into a reset state. When the FC/SATA port 402 is released from its reset state, it stops sending the ComReset signal 404 to the SATA drive 400. The rx_los detector circuit 426 in the SATA drive senses that the ComReset signal 404 is no longer being received, and transmits a Commit 412 signal back to the FC/SATA port or initiator 402 on differential lines 414 for a fixed period of time. The ComInit signal 412 is an OOB signal that looks identical to the ComReset signal 404 in that it is also a sequence of (e.g. six) fixed SATA driver transmitter "on" periods (e.g. 106 ns) containing SATA Align primitives followed by longer fixed SATA drive transmitter "off" periods (e.g. 318 ns).

When the FC/SATA port 402 receives and detects signal level sequences representing a ComInit signal 412 using a rx_los detector circuit 424 coupled to the differential receive lines 414, it will wait until it detects that the ComInit signal has ceased, then perform some calibration routines. The FC/SATA port 402 will then send a ComWake signal 416 for a fixed period of time on differential lines 414 that is similar to the ComInit signal, except with shorter transmitter "off" periods. When the SATA drive 400 receives and detects signal level sequences representing a ComWake signal 416, including a fixed number of (e.g. at least three) consecutive expected "off" periods of the duration expected in a ComWake signal, it will wait until it detects that the ComWake signal has ceased, then perform some calibration routines. The SATA drive 400 will then send its own ComWake signal 422 for a fixed period of time on differential lines 414, followed by SATA Align primitives.

When the FC/SATA port 402 receives and detects the ComWake signal 422, it will wait until it detects that the ComWake signal has ceased. The FC/SATA port will then send D10.2 primitives and start looking for the SATA Align primitives. If the FC/SATA port 402 receives the expected SATA Align primitives, it synchronizes to the SATA Align primitives and then sends its own SATA Align primitives out over differential lines 410. When the SATA drive 400 receives the SATA Align primitives, it synchronizes to them and sends back non-Align primitives over differential lines 414. When the FC/SATA port 402 receives the non-Align primitives, the SATA OOB initialization sequence ends.

Note that in contrast to the SATA OOB initialization sequence described above, FC drives turn their transmitters on, but do not turn them off, so a FC drive will present a steady "on" period in contrast to the on/off patterns described above (in addition to transmitting FC ordered sets). The host is therefore able to clearly distinguish between an attached FC drive and a SATA/SAS drive. Note that the sequence described above is for the 1.5 Gbps speed negotiation only. 3.0 Gbps and future data rate sequences would be processed in a like manner, supporting any minor variations as required for the new speed.

Figure 5:
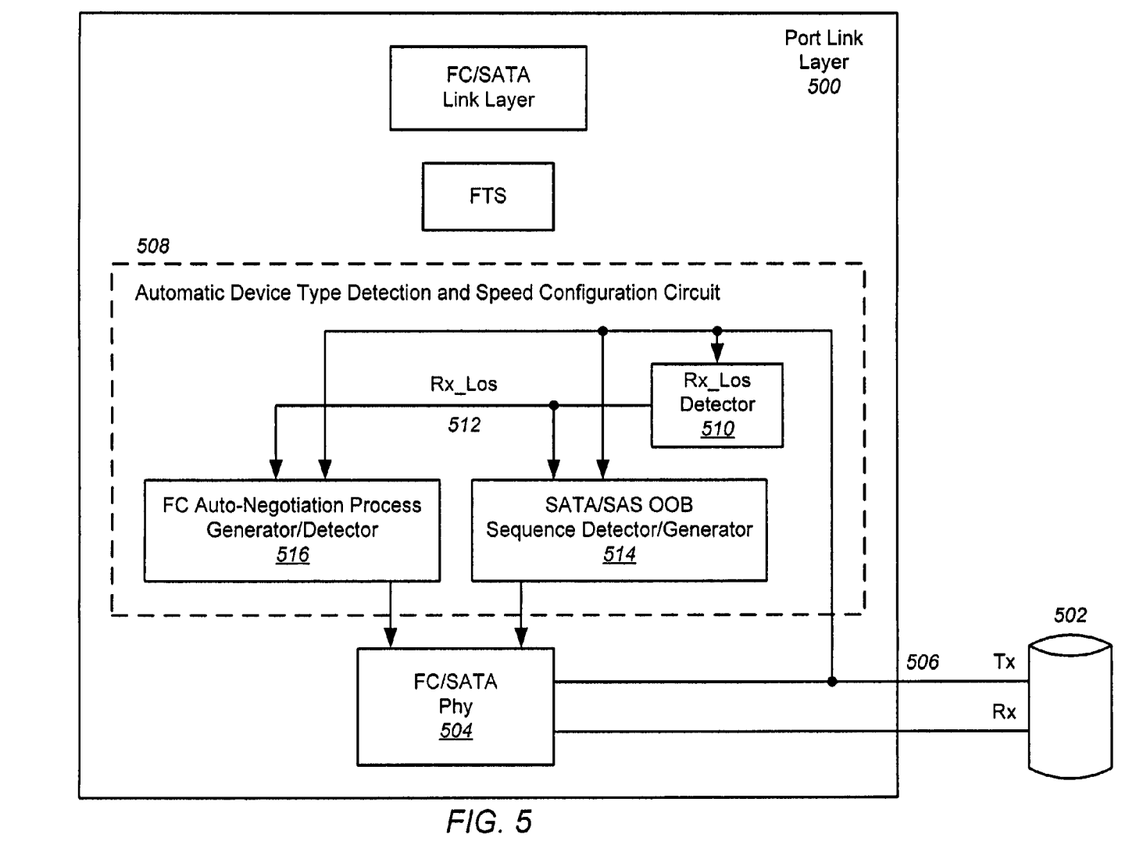
FIG. 5 illustrates an exemplary FC/SATA port in a FAST switch and an attached disk drive, the FC/SATA port including an automatic device type detection and speed configuration circuit according to embodiments of the present invention.
Figure 6:
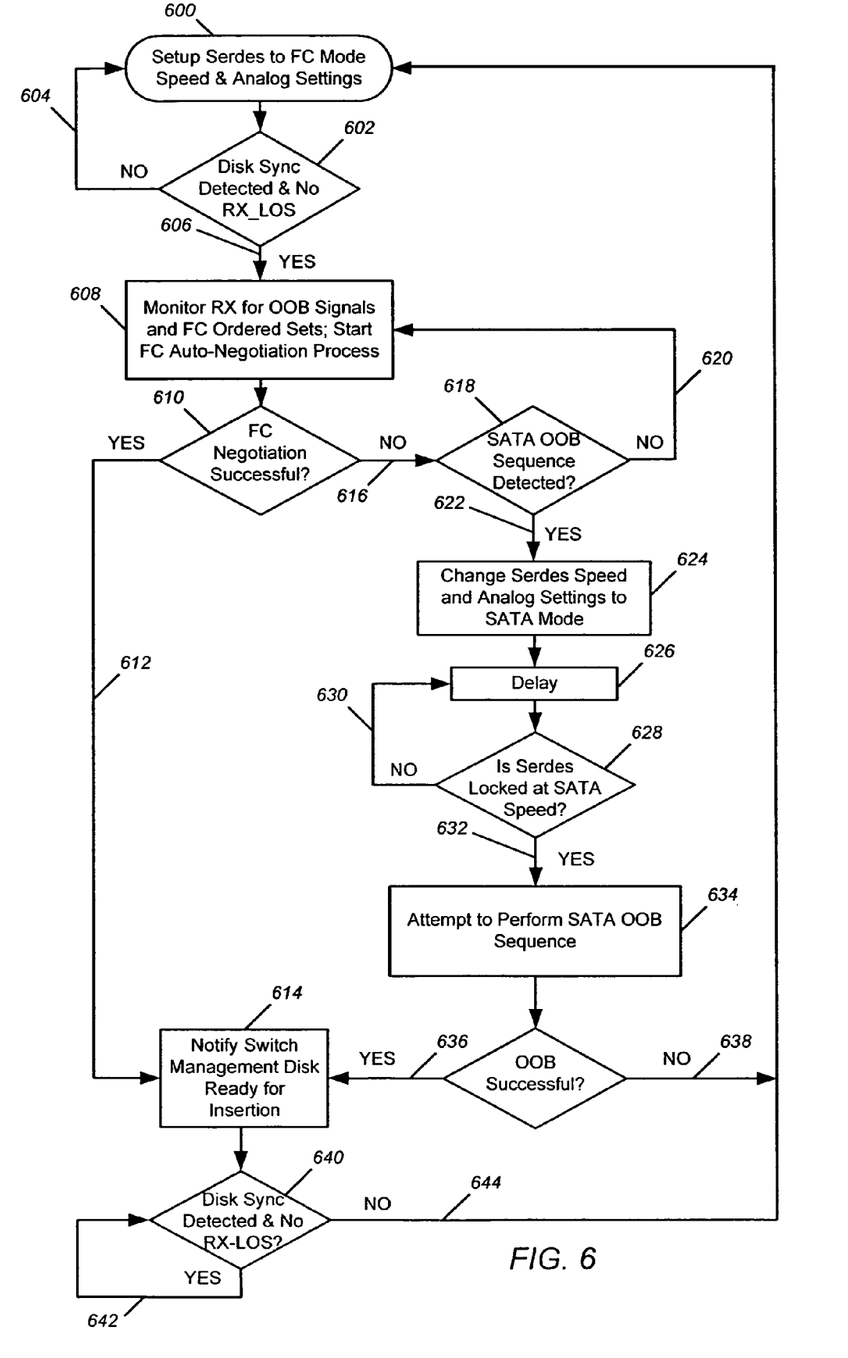
FIG. 6 illustrates an exemplary flow diagram of an automatic device type detection and speed configuration process according to embodiments of the present invention.

FIG. 5 illustrates an exemplary port link layer 500 in a FC/SATA port in a FAST switch, an attached device 502, and an automatic device type detection and speed configuration circuit 508 within the FC/SATA port according to embodiments of the present invention. FIG. 6 illustrates an exemplary flow diagram of the automatic device type detection and speed configuration process according to embodiments of the present invention.

In FIG. 5, when the FAST switch is first powered up, hardware configuration mechanisms initialize the FC/SATA Phy 504 to a FC speed such as the highest possible FC speed (e.g. 4 GBits/sec) and analog settings (see block 600 in FIG. 6). Configuring the FC/SATA Phy 504 so that it is FC-compliant during the idle state allows quick servicing of FC devices so that FC insertion timing specifications may be met and time is not wasted changing to FC speeds and waiting for Phase-Locked Loops (PLLs) and other circuits to settle. Next, a rx_los detector circuit 510 within the automatic device type detection and speed configuration circuit 508 monitors the receive path 506 to determine if a receive signal is present (see block 602 in FIG. 6). The receive loss (rx_los) detector circuit 510 employs standard circuits well known to those skilled in the art and detects differential voltage levels, envelopes, pulses or the like on the receive path 506 to determine if a receive signal is present. The rx_los detector circuit 510 generates a rx_los signal 512. As long as there is no receive signal, indicating that no device has been inserted, the FC/SATA Phy 504 remains at the same FC speed and the rx_los detector circuit 510 continues to monitor the receive path 506 for a receive signal (see loop 604 in FIG. 6).

When a signal is detected (i.e. rx_los is de-asserted) (see 606 in FIG. 6), this may be an indication that either a FC device has been attached (in which case rx_los would remain de-asserted) or that a SATA/SAS device has been attached (in which case rx_los would change states from asserted to de-asserted at regular, predictable intervals). Thus, when a receive signal is detected, as evidenced by rx_los being de-asserted, a SATA/SAS OOB sequence detector/generator 514 monitors the receive path 506 for known SATA OOB sequences. The SATA/SAS OOB sequence detector/generator 514 comprises standard hardware circuits that may include, but are not limited to level detectors, comparators, counters, registers, timers, flip flops and gates well known to those skilled in the art that detect rx_los signals and the amount of time that rx_los is asserted and de-asserted in an attempt to detect any known SATA OOB sequences or a SATA OOB initialization sequence. At the same time, a FC auto-negotiation process detector/generator 516 monitors the receive path 506 for expected FC ordered sets and then starts a known FC auto-negotiation process under the assumption that the inserted device is a FC device (see block 608 in FIG. 6). The FC auto-negotiation process detector/generator 516 comprises standard hardware circuits that may include, but are not limited to level detectors, comparators, counters, registers, timers, flip flops and gates.

If rx_los remains de-asserted (i.e. a receive signal is present), the expected FC ordered sets for FC auto-negotiation are received, and the FC auto-negotiation process completes successfully (see block 610 and line 612 in FIG. 6) indicating that a FC device was inserted, then the FC auto-negotiation process detector/generator 516 notifies the switch management hardware and firmware that the device is a FC device and is ready for logical insertion into the switch fabric within the switch (see block 614 in FIG. 6). Thereafter, as long as there is no loss of receive signal (i.e. rx_los remains de-asserted), there is no further change of state (see block 640 and loop 642). If a loss of receive signal is ever detected (i.e. rx_los is asserted) (see line 644), then firmware in the FAST switch once again initializes the FC/SATA Phy 504 to a FC speed such as the highest possible FC speed (e.g. 4 GBits/sec) and analog settings (see block 600 in FIG. 6), and the automatic device type detection and speed configuration process starts again.

However, referring back to block 610 in FIG. 6 and as mentioned above, note that during the time when the FC auto-negotiation process detector/generator 516 is determining whether or not the FC auto-negotiation process is successful, the SATA/SAS OOB sequence detector/generator 514 is also checking to see if known SATA OOB sequences are being received (see block 618 in FIG. 6) by monitoring the receive path 506. If the FC auto-negotiation process is not successful (see line 616 in FIG. 6) and a known SATA OOB sequence is not detected (see line 620 in FIG. 6), the process once again monitors the receive path 506 for known SATA OOB sequences or expected FC ordered sets. However, if the FC auto-negotiation process is not successful but any known SATA OOB sequence is detected, this is an indication that a SATA device has been inserted, and thus the SATA/SAS OOB sequence detector/generator 514 directs the FAST switch to change the FC/SATA Phy 504 to a SATA speed such as the lowest possible SATA speed (e.g. 1.5 GBit/sec) and SATA analog settings (see block 624).

After some delay passes (see block 626 in FIG. 6), the port link layer 500 determines whether the FC/SATA Phy 504 has become locked at a SATA speed (see block 628 in FIG. 6). If the FC/SATA Phy 504 has not yet become locked at a SATA speed (see line 630 in FIG. 6), the process returns to block 626, and more delay passes while the port link layer 500 waits for the FC/SATA Phy 504 to become locked at a SATA speed.

If the FC/SATA Phy 504 has become locked at a SATA speed (see line 632 in FIG. 6), the SATA/SAS OOB sequence detector/generator 514 controls the FC/SATA Phy 504 and attempts to participate in the SATA OOB initialization sequence of FIG. 4 with the inserted SATA device (see block 634). If the SATA OOB initialization sequence of FIG. 4 completes successfully, the SATA/SAS OOB sequence detector/generator 514 further attempts to detect a ComSAS OOB sequence, which is well-known to those skilled in the art. ComSAS sequences are described in "In-Depth Exploration of Serial Attached SCSI" (ISBN 0-931836-60-3) by David A. Deming and Robert W. Kembel, the contents of which are incorporated by reference herein. If a ComSAS OOB sequence is detected, the attached device is determined to be a SAS device, and is refused an active connection to the FAST switch. However, if a ComSAS OOB sequence is not detected, the attached device is determined to be a SATA device.

If the device is determined to be a SATA device (see line 636 in FIG. 6), then the SATA/SAS OOB sequence detector/generator 514 notifies the switch management hardware and firmware that the device is a SATA device ready for insertion (see block 614 in FIG. 6). Thereafter, as long as there is no loss of receive signal (i.e. rx_los is deasserted), there is no further change of state (see block 640 and loop 642). If a loss of receive signal is subsequently detected (i.e. rx_los is asserted) (see line 644), then the FC/SATA Phy 504 is once again initialized to the highest possible FC speed (e.g. 4 GBits/sec) and analog settings (see block 600 in FIG. 6), and the automatic device type detection and speed configuration process starts again. Referring back to block 634, if the SATA OOB initialization sequence is unsuccessful (see line 638 in FIG. 6), the FC/SATA Phy 504 is once again initialized to the highest possible FC speed (e.g. 4 GBits/sec) and analog settings (see block 600 in FIG. 6), and the automatic device type detection and speed configuration process starts again.

In other embodiments of the present invention, to improve Reliability, Availability, and Serviceability (RAS), another signal may be monitored in block 602 in FIG. 6. In addition to monitoring the FC/SATA Phy receive path 506 to determine if a receive signal is present (i.e. rx_los is de-asserted), device synchronization may also be detected. Device synchronization may be detected by monitoring a ModDef pin. In FC, ModDef[0] is asserted low if a FC device is present in a Small Form-factor Pluggable (SFP) interface, and is de-asserted high if no FC device is present. If a tailgate adapter card is used to connect a SATA device to a FC SFP interface, then ModDef[0] may also be asserted low when a SATA device is present, and is deasserted high if no SATA device is present in a SFP. Thus, ModDef[0] may be used as an additional verification that a drive is present, but it is not sufficient to determine the type of drive present. It is still necessary to observe the receive loss signal to determine the type of drive.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A Fibre Channel (FC)/Serial Advanced Technology Attachment (SATA) port of a multi-protocol switch couplable to SATA devices over a SATA connection and to FC devices over an FC connection through the FC/SATA ports, and comprising:
   an FC/SATA Phy configured to initially operate at an FC speed, before a protocol associated with an attached device and an operating speed of the attached device are determined;
   an automatic device type detection and speed configuration circuit within the FC/SATA port, comprising
      a receive loss (rx_los) detector for detecting a presence or an absence of a receive signal from the attached device to the FC/SATA port and generating an rx_los signal in response to the presence or absence of the receive signal,
      a SATA/SAS Out Of Band (OOB) initialization sequence detector/generator coupled to the rx_los detector, wherein the SATA/SAS OOB initialization sequence detector/generator monitors the rx_los signal, and in response to detecting the rx_los signal changing states from asserted to de-asserted at regular, predictable intervals, monitors the receive signal for any known SATA OOB sequence, and upon detecting a known SATA OOB sequence, directs the multi-protocol switch to set the FC/SATA Phy within the FC/SATA Port to a SATA speed, and
      an FC auto-negotiation process detector/generator coupled to the rx_los detector, wherein the FC auto-negotiation process detector/generator, in response to detecting a de-asserted state of the rx_los signal, monitors the receive signal for FC ordered sets associated with the FC auto-negotiation process, participates in an FC auto-negotiation process with the attached device, detects whether the FC auto-negotiation process was successful, and notifies the multi-protocol switch that the attached device is an FC device and is ready for insertion if the FC auto-negotiation process was successful.

2. The FC/SATA port as recited in claim 1, wherein the SATA/SAS OOB initialization sequence detector/generator is configured for participating in a SATA OOB initialization sequence with the attached device, detecting whether the SATA OOB initialization sequence was successful, and notifying the multi-protocol switch that the attached device is a SATA device and is ready for insertion if the SATA OOB initialization sequence was successful.

3. The FC/SATA port as recited in claim 2, wherein the SATA/SAS OOB initialization sequence detector/generator is configured for detecting whether a ComSAS sequence is received after detecting a successful SATA OOB initialization sequence, and directing the multi-protocol switch to refuse an active connection with the attached device if a ComSAS sequence was received.

4. The FC/SATA port as recited in claim 1, wherein when the FC/SATA port utilizes a Small Form-factor Pluggable (SFP) electrical interface and any SATA devices are connected via a tailgate adapter modified to assert a ModDef[0] pin on the SPF interface, the rx_los detector is further configured for receiving the ModDef[0] pin as a further indication that a drive has been attached.

5. A multi-protocol switch comprising the port recited in claim 1.

6. A disk drive enclosure comprising the multi-protocol switch recited in claim 5.

7. A Storage Area Network (SAN) comprising the disk drive enclosure recited in claim 6.

8. In a multi-protocol switch couplable to Serial Advanced Technology Attachment (SATA) devices over a SATA connection and to Fibre Channel (FC) devices over an FC connection through FC/SATA ports, a method for automatic device type detection and speed configuration within one of the FC/SATA ports, comprising:
   initially setting an FC/SATA Phy associated with the one of the FC/SATA ports to an FC speed, before a protocol associated with an attached device and an operating speed of the attached device are determined;

detecting a presence or an absence of a receive signal from the attached device to the FC/SATA port by an rx_los detector circuit and generating an rx_los signal in response to the presence or the absence of the receive signal;

monitoring the receive signal for expected FC ordered sets that are part of an FC auto-negotiation process in response to detecting a de-asserted state of the rx_los signal, said monitoring and detecting being performed by a first circuit;

monitoring for any known SATA OOB sequence at the received signal in response to detecting the rx_los signal changing states from asserted to de-asserted at regular, predictable intervals, said monitoring and detecting being performed by a second circuit simultaneously with the monitoring and detecting performed by the first circuit; and setting the FC/SATA Phy within the FC/SATA port to a SATA speed upon detecting any known SATA OOB sequence.

9. The method as recited in claim 8, further comprising:

participating in an FC auto-negotiation process with the attached device by the first circuit in response to detecting a change of the state of the rx_los signal;

detecting whether the FC auto-negotiation process was successful; and notifying the multi-protocol switch that the attached device is an FC device and is ready for insertion if the FC auto-negotiation process was successful.

10. The method as recited in claim 8, further comprising:

participating in a SATA OOB initialization sequence with the attached device by the second circuit;

detecting whether the SATA OOB initialization sequence was successful; and notifying the multi-protocol switch that the attached device is a SATA device and is ready for insertion if the SATA OOB initialization sequence was successful.

11. The method as recited in claim 10, further comprising:

detecting whether a ComSAS sequence is received after detecting a successful SATA OOB initialization sequence; and directing the multi-protocol switch to refuse an active connection with the attached device if a ComSAS sequence was received.

12. The method as recited in claim 8, wherein when the FC/SATA port utilizes a Small Form-factor Pluggable (SFP) electrical interface and any SATA devices are connected via a tailgate adapter modified to assert a ModDef[0] pin on the SPF interface, the method further comprises configuring the rx_los detector for receiving the ModDef[0] pin as a further indication that a drive has been attached.

* * * * *